Dec. 24, 1957 E. M. BALDWIN 2,817,480

ELECTRONIC DATA TRANSLATING SYSTEM

Filed May 17, 1954 3 Sheets-Sheet 1

INVENTOR
EWART M. BALDWIN,

BY
Henry Heyman
ATTORNEY.

Dec. 24, 1957 E. M. BALDWIN 2,817,480

ELECTRONIC DATA TRANSLATING SYSTEM

Filed May 17, 1954 3 Sheets-Sheet 2

INVENTOR.
EWART M. BALDWIN,
BY Henry Heyman
ATTORNEY.

INVENTOR
EWART M. BALDWIN,
BY
Henry Heyman
ATTORNEY.

United States Patent Office 2,817,480

Patented Dec. 24, 1957

2,817,480

ELECTRONIC DATA TRANSLATING SYSTEM

Ewart M. Baldwin, Los Angeles, Calif., assignor to Hughes Aircraft Company, Culver City, Calif., a corporation of Delaware Application May 17, 1954, Serial No. 430,362

20 Claims. (Cl. 235—61.7)

The present invention relates to an electronic data translating system, and more particularly to a system for photoelectrically sensing and electronically transforming intelligence placed on data bearing cards or sheets.

The use of individual data bearing cards to record intelligence by means of punches or marks placed thereon has become well established in the accounting field. Such cards, known as Hollerith or Powers cards, present a number of advantages which have lead to their general acceptance for the storage of information. The development of high speed electronic computing machines, however, has created a need for faster and more efficient methods of transferring data from punched cards to such computing machines, if the advantages afforded by the use of cards are to be retained without sacrificing the high speed inherent in electronic computation.

While a number of systems have heretofore been utilized for sensing data bearing cards, such systems generally have not been adaptable for high speed, error-free operation. For example, prior art systems have frequently employed mechanical elements, such as brushes or levers, to sense the punch marks on the cards. Such elements, due to mechanical inertia and friction, are severely limited as to maximum speed of response. In addition, owing to the complexity of the sensing devices employed, it has been uneconomical to sense the cards more than once during each passage. The prior art systems also have generally required that the card moving means hold the card in a precise position during sensing in order to accurately identify the particular column being sensed. This requirement has been met, for example, by inhibiting the motion of the card during the sensing interval, or by rigidly coupling the card to the card moving means in a predetermined position. In either case the requirement severely limits the maximum speed at which cards may be sensed.

The present invention, on the other hand, overcomes the above and other disadvantages of the prior art systems by providing a self-synchronizing high speed electronic data translating system which includes a number of features to provide essentially error-free operation. According to the basic concept of the invention, cards to be sensed are fed endwise to the system, and are sensed while in motion by a unique photo-diode matrix which includes means for initiating and discontinuing the sensing function, and a plurality of reading stations for successively sensing each column of data on the cards at each reading station. The data sensed by each reading station is then compared with the data sensed at the other reading stations to indicate the identity or non-identity of the compared data, non-identity serving to indicate that an error or malfunction has occurred.

The card feeding means of the system is synchronously interlocked with the electronic sensing elements of the system by synchronizing signals which are generated as a function of card displacement through the system.

Accordingly, irregularities in the speed of card feed are automatically compensated for. In addition, cards may be entered into the system at random or at closely spaced intervals, since the initiation and discontinuance of card sensing is a function of means independent of the card feeding mechanism. Accordingly, the system is inherently a self-synchronous high speed device.

The data translating system of the present invention also includes means for converting the sensed data into codes other than the card punch code, these means being essentially independent of the sensing components of the system.

Still another novel feature of the system is that the card sensing operation takes place in a fraction of the interval during which the card is in sensing position. Accordingly, the system has a high tolerance with respect to the actual position of the card at the moment the data in any column is being sensed. The system, therefore, is highly tolerant of the usual irregularities in the size and position of the cards and their punchings, as well as of card slippage and flexing within the card feeding mechanism.

Accordingly, it is an object of the present invention to provide a self-checking system for receiving individual data bearing cards, and for sensing and checking the data punched or marked thereon to provide electronic output signals representing the sensed data.

Another object of the present invention is to provide an electronic data translating system for randomly receiving conventional punched or marked cards, sensing the data punched or marked thereon, and providing electrical output signals representing the sensed data.

A further object of the present invention is to provide a high speed system of the class described wherein the sensing operation is performed sequentially on a plurality of cards while the cards are in motion.

A still further object of the present invention is to provide a system of the class described wherein the sensing operation is performed by a unique photo-diode reading matrix which includes sensing means for initiating and discontinuing the data translating function of the system, and a plurality of data sensing stations for successively sensing each column of data on the cards at each sensing station, and providing a corresponding plurality of sets of output signals representing the sensed data.

A still further object of the present invention is to provide a system of the class described which includes conversion matrices for the conversion of the data punched or marked on the cards into codes other than the card punch code.

Still another object of the present invention is to provide a system of the class described which includes means for comparing the signals derived from successive sensing of the same data column on the card, and producing an output signal indicating the identity or non-identity of such signals, thereby indicating errors or malfunctions within the system.

A further object of the present invention is to provide a system of the class described which is inherently designed to tolerate variations in the rate of card feed, card slippage, flexing, etc., without introducing errors in the output signals from the system.

The novel features which are believed to be characteristic of the invention, both as to its organization and method of operation, together with further objects and advantages thereof, will be better understood from the following description considered in connection with the accompanying drawings in which an embodiment of the invention is illustrated by way of example. It is to be expressly understood, however, that the drawings are for the purpose of illustration and description only, and are not intended as a definition of the limits of the invention.

Figure 3B:
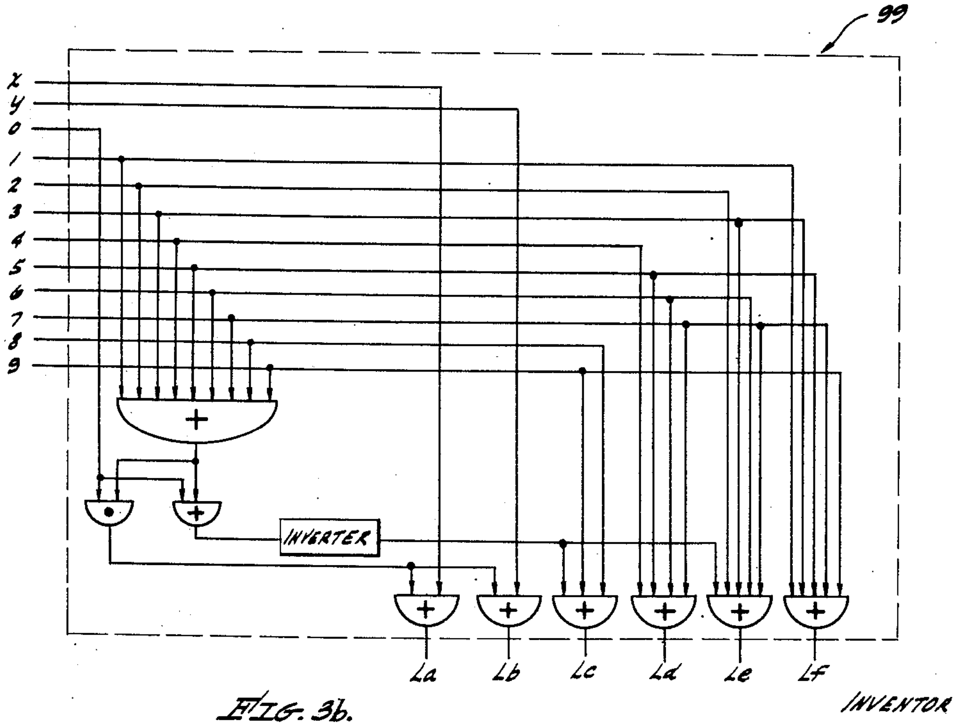
Figures 2, 3A, 4:
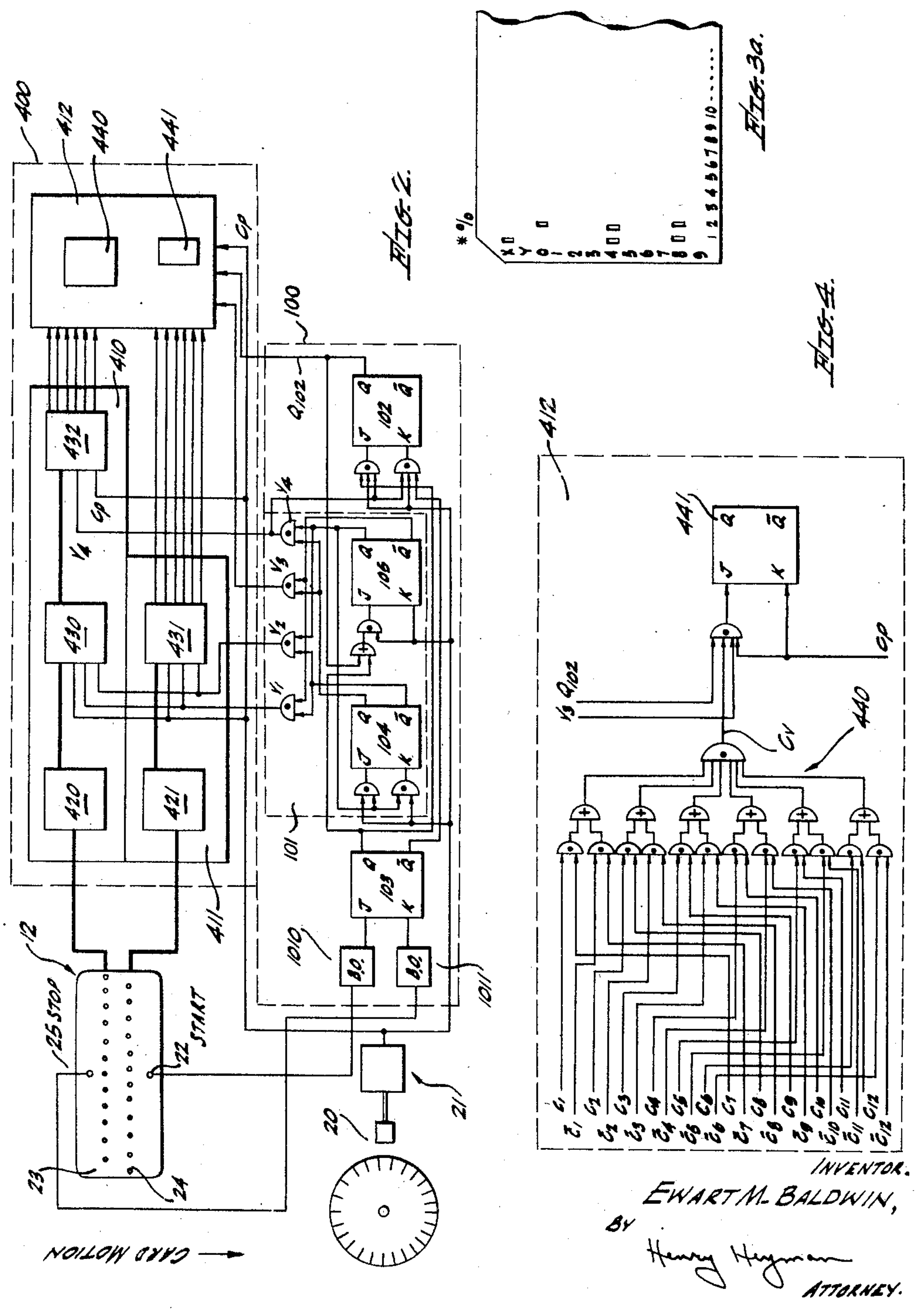
Fig. 2 is another diagram of the system of Fig. 1, illustrating certain elements of the system in greater detail.
Figure 5:
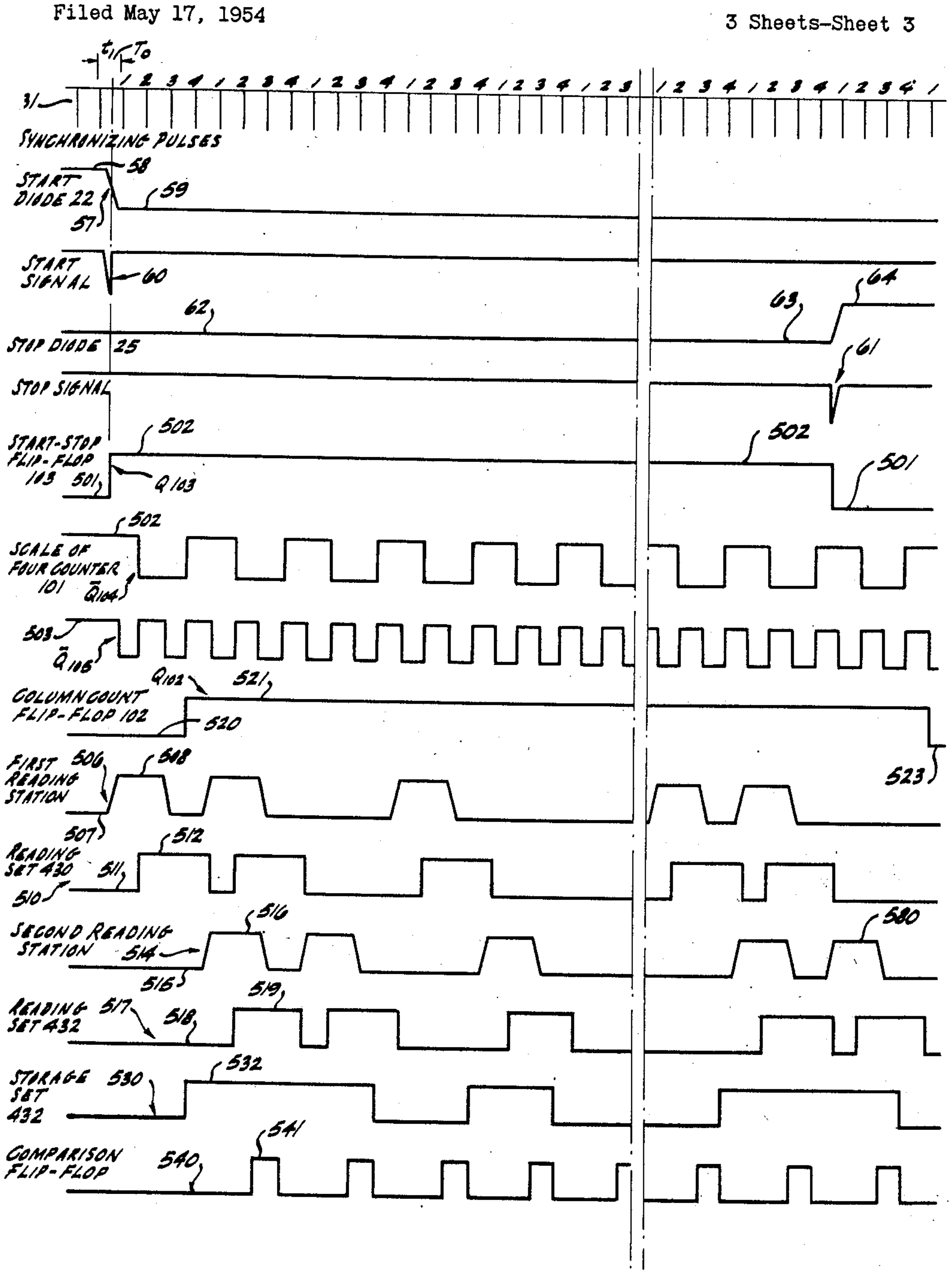

Fig. 3*a* is a diagram of a portion of a typical data card upon which the data translation operation of the present system may be performed;

Fig. 3*b* is a schematic diagram of the code conversion matrix of the present invention;

Fig. 4 is a schematic diagram of the comparison circuit of the present invention; and Fig. 5 is a timing diagram illustrating the operation of the system of the present invention.

*General description*

Figure 1:
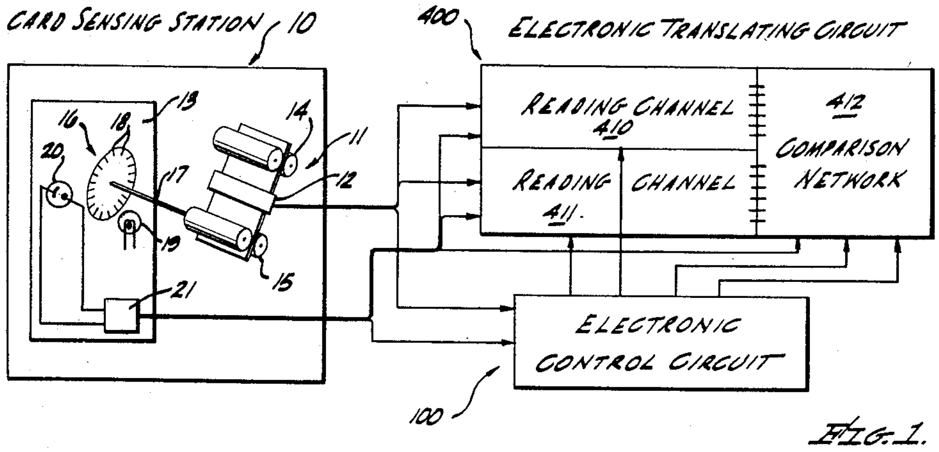
Fig. 1 is an overall diagram of the system of the present invention.

Turning now to the drawings, wherein like figures refer to the same or similar elements in the several views, there is shown in Fig. 1 a pictorial diagram of the electronic data translating system of the present invention. As shown in Fig. 1, the system includes three basic elements, namely, a card sensing station 10 for sensing the data on the cards, an electronic control circuit 100 for generating output control signals, and an electronic translating circuit 400 operable in response to the output control signals for converting the sensed data to electrical output signals. The function of card sensing station 10 is to receive individual cards, to move the cards through the station, to sense the data marked or punched thereon, and to generate control, data, and synchronizing signals in accordance therewith. The control signals generated by sensing station 10 are supplied to electronic control circuit 100 which in turn, generates and supplies output control signals to electronic translating circuit 400. Electronic translating circuit 400 receives data and synchronizing signals from card sensing station 10, and, operating under the control of the synchronizing signals from the sensing station and the output control signals from electronic control circuit 100, translates the sensed data signals into output signals representing data marked on the cards.

More particularly, card sensing station 10 is designed to receive marked or punched cards, similar to those shown in Fig. 3*a*, and includes a mechanical card transport device 11 for moving the cards, a photo-diode reading and control matrix 12, shown in more detail in Fig. 2, for sensing the data on the cards, and a synchronizing signal generating device 13, coupled to card transport device 11, for supplying synchronizing or clock signals to the system. Photo-diode reading and control matrix 12 produces first and second sets of data signals representing the data on the cards, and first and second control signals in response to the passage of the leading and trailing edge, respectively, of a card. Electronic control circuit 100 receives control signals from diode matrix 12 and synchronizing signals from synchronizing signal generating device 13 and produces output signals which control the operation of electronic translating circuit 400. Electronic translating circuit 400 receives the sets of data signals from diode matrix 12, converts the signals to a preferred code utilizing conversion matrices shown in greater detail in Fig. 3*b*, and, operating under the control of the signals from control circuit 100, compares the sets of converted data signals and produces output signals representing the data marked on the cards and a signal indicating the result of the comparison operation.

In order to present a complete description of the electronic data translating system of this invention, each of the three basic elements will now be described in detail. In the description which follows, each element will be described in structural detail with reference to Fig. 1 and the following detailed figures. Upon completion of the structural description, the operation of the system will be described with reference to the composite waveform diagram of Fig. 5.

*Card sensing station*

As set forth above, card sensing station 10 includes a card transport device 11, a photo-diode matrix 12, and a synchronizing signal generating device 13, and is designed to produce synchronizing signals and data and control signals in response to the passage of a card therethrough. The card transport device includes two pairs of feed rollers 14 and 15 and is designed to receive a data bearing card such as that shown in Fig. 4, edgewise first, and move the card through the station so that the card passes photo-diode matrix 12 column by column, according to the conventional terminology. Feed rollers 14 and 15 are driven continuously at a uniform rate by a drive motor, not shown.

Synchronizing signal generating circuit 13 is mechanically coupled to one of the feed rollers and provides a plurality of uniformly spaced synchronizing pulses when the card transport device moves a card forward one column width, where a column width is defined as the width of a punch mark plus one adjacent space. According to one preferred embodiment of the invention synchronizing signal generating device 13 produces four uniformly spaced synchronizing pulses per column width. It should be understood, however, that any other number of pulses, as for example, 6 or 8, may be used if appropriate modification of the associated electronic circuitry is made.

More particularly, as shown in Fig. 1, synchronizing signal generating device 13 includes a synchronizing wheel 16, mechanically coupled to card feed roller pair 15 by means of a shaft 17, and having a plurality of uniformly spaced radial slots 18 cut into the edge thereof. A source 19 of illumination and a photo-diode 20 are arranged on opposite sides of the synchronizing wheel so that the light from light source 19 falling on photo-diode 20 is periodically interrupted by synchronizing wheel 16 and a pulse output signal is produced by photo-diode 20 as each of slots 18 passes between light source 19 and photo-diode 20. The diameter of the feed rollers and the number of slots in synchronizing wheel 16 are so selected that an integral number of slots pass photo-diode 20 when the feed rollers move the card forward one column width, the integral number of slots being the desired number of pulses per column width. The output circuit of photo-diode 20 is connected to the input circuit of a blocking oscillator 21 which is responsive to the applied input pulses to produce a corresponding number of output pulses of the desired waveform, one output pulse being generated upon the application of each input pulse.

It should be noted that while card feed rollers 14 and 15 rotate continuously, a particular card may be entered into the system at any time and accordingly, there is no fixed relationship between the leading edge of the card and the generated synchronizing signals. However, once a card is entered into the system, it is firmly gripped by the feed rollers and, as the card moves forward, synchronizing signals are generated as a direct function of card displacement. Minor variations in card drive speed introduce corresponding variations in the frequency at which the synchronizing signals are generated, thereby maintaining synchronism between the card motion and the synchronizing signals until the card is ejected from the card transport device.

*Photo diode reading and control matrix*

It has been set forth previously that card sensing station 10 includes a photo-diode reading and control matrix 12 which has a plurality of photo-diodes for producing control and data signals in accordance with the transmission or reflection of light by the cards. As shown in greater detail in Fig. 2, the matrix includes a start diode 22 for producing a start signal to initiate the generation of control signals by the electronic control circuit, first and second reading stations 23 and 24, respectively, for producing data signals in accordance with the data on the card, and a stop diode 25 for producing a signal to discontinue the generation of control signals by the electronic control circuit.

More specifically, each of reading stations 23 and 24 comprises a plurality of reading photo-diodes, one diode being provided for each data row on the card. The diodes of each reading station are arranged to simultaneously sense one data column on the card, reading station 23 being the first reading station to sense a particular row of data as the card is moved through the system. Start diode 22 and stop diode 25, on the other hand, are arranged to generate signals only in response to the passage of the leading and trailing edges, respectively, of the cards. Accordingly, each of these diodes is positioned so that the portion of the card which passes it is an area which includes no punched data.

The relative positions of the start and stop diodes and the first and second reading stations are determined by the distance between the leading edge of the card and the first column of data, and the distance between the trailing edge of the card and the last column of data. The relative positions of the first and second reading stations are, however, a function of the electrical design of the system, and the reading stations may, therefore, be disposed with respect to each other in a preferred manner.

Considering now these relative positions, start diode 22 is positioned with respect to first reading station 23 so that the leading edge of the card is sensed by the start diode as soon as the first data column is in sensing position before the first reading station. Similarly, stop diode 25 is arranged with respect to second reading station 24 so that the diode senses the trailing edge of the card when the last data column is in sensing position before the second reading station.

While the relative positions of the start and stop diodes with respect to the reading stations are determined by the geometry of the cards to be sensed, the relative positions of the reading stations with respect to each other is preselected as a function of the system. More specifically, two reading stations are included within the system to sense the data twice to provide a self-checking system which compares the data sensed by each station. The photo-diodes may be arranged so that both reading stations sense the same data column simultaneously, with the diodes corresponding to a particular row laterally displaced so that each diode senses a different portion of the punched hole. In this manner, errors caused by defective punching and tears or breaks in the cards may be detected. On the other hand, the diodes may be arranged so that the data in a particular column is sensed by first one reading station and subsequently by the other reading station. The lateral displacement feature between diodes arranged to read punched holes following in the same row may be retained in such an embodiment, while the respective reading stations may be linearly displaced to provide a discreet interval between the sensing of a particular data column by the first and second reading stations, respectively.

According to one preferred embodiment of the invention, first and second reading stations 23 and 24 are displaced one column width from each other, where a column width is defined as a punch width plus one adjacent space width. When displaced in this manner the first reading station will sense a first data column at the same instant in time that the second reading station is sensing an adjacent data column. When mechanized in this manner, the output signals from the first reading station may be delayed in time by an appropriately introduced delay circuit to provide for the comparison of the two sets of sensed data at a particular interval in time. As will be later shown, the pulse sensing feature of the present invention makes the system readily adaptable to provide for such a delay.

According to another preferred embodiment of the invention, the first and second reading stations are displaced an integral fraction of a column width from each other. Preferably, the fraction of a column width selected should correspond to the time spacing between an integral number of synchronizing pulses as produced by the synchronizing pulse generating wheel. When mechanized in this manner, use may be made of an appropriate one of the synchronizing pulses to sense the proper reading station output signal set. According to such a mechanization, additional delays within the system may or may not be necessary, depending upon the time interval through which the desired signals are available.

For example, if the system provides four synchronizing pulses per column width and the reading stations are displaced three-quarters of a column width apart, the first pulse corresponding to a particular column may be used to sense the first reading station while the fourth pulse may be used to sense the second reading station, the first pulse of the succeeding column being utilized to generate a comparison signal indicative of whether the same data has been read by the two reading stations. The mechanization of the electronic control circuit to provide for such a mode of operation will be discussed in greater detail hereinbelow.

*Electronic control circuit*

Electronic control circuit 100 receives signals from start diode 22 and stop diode 25 of matrix 12, and synchronizing signals from synchronizing signal generating device 13, and produces output control signals for controlling the response of electronic translating circuit 400 to applied data signals. More particularly, as shown in Fig. 2, electronic control circuit 100 includes a scale-of-four counter 101 for cyclically producing output control signals on its four output leads in response to applied synchronizing pulses, a column count flip-flop or bistable element 102 for producing a comparison control signal $Q_{102}$, and a start-stop bistable element or flip-flop 103 which initiates, and, in conjunction with count flip-flop 102 discontinues, the cyclic operation of scale-of-four counter 101.

More specifically, scale-of-four counter 101 cyclically produces control signals on its four output leads in response to synchronizing pulses when start-stop flip-flop 103 is set to its start state by a signal from start diode 22. Since the synchronizing signals are maintained in accurate synchronism with the motion of the card through the system, the control signals are similarly maintained in synchronism, the four control signals being repeated in sequence as the card moves forward through the system.

As will be understood from the previous discussion, in the embodiment of the invention wherein the first and second reading stations are displaced apart one column width, data signals from the second reading station for the first data column on the card are not available until the second data column is before the first reading station, or until the second cycle of scale-of-four counter 101. Since the comparison function of the electronic translating circuit cannot be performed until data signals are available from both reading stations, count flip-flop 102 is included within the system to provide a comparison control signal which defines the interval during which the comparison function may be carried out.

Similarly, it will be understood from the previous discussion that the sensing of the last data column on the card by the second reading station is performed during the $(n+1)$th column width interval, where $n$ is the number of column widths, or data columns, in the data-bearing area of the card. In order to provide that the scale-of-four counter go through $(n+1)$ complete cycles, and then return to its initial state, the discontinuance of cycling by scale-of-four counter 101 is controlled by the setting of start-stop flip-flop 103 to its stop state in response to signals from stop diode 25, and the setting of count flip-flop 102 to its non-compare state.

Referring again to Fig. 2, there is shown a block diagram of one embodiment of the electronic control circuit of the present invention, wherein the desired response is achieved by appropriate interconnection of the respective elements of the circuit. As shown in Fig. 2, count flip-flop 102 is a bistable element having two input terminals, designated J and K respectively, and is responsive to signals applied to either of its input terminals to set to a corresponding stable state, which may be designated the 1 and 0 states, respectively. Flip-flop 102 has two output terminals, designated $Q_{102}$ and $Q_{102}$, upon which signals having a relatively high voltage level appear when the flip-flop is in its 1 and 0 states, respectively. The signal appearing on each output terminal is of relatively low voltage level when the bistable element is not in the corresponding stable state. In accordance with well known practice, count flip-flop 102 may conveniently be a conventional Eccles-Jordan multivibrator.

Start-stop flip-flop 103 similarly has two input terminals, designated $J_{103}$ and $K_{103}$, and two output terminals, $Q_{103}$ and $\bar{Q}_{103}$, and is responsive to applied input signals in a manner similar to flip-flop 102. The output circuit of start diode 22 is connected to apply input signals to the J input of flip-flop 103, through a start blocking oscillator 1010, while the output circuit of stop diode 25 is connected to apply input signals to the K input of flip-flop 103 through a stop blocking oscillator 1011.

Scale-of-four counter 101 includes a pair of flip-flops 104 and 105, each having two input terminals, designated $J_{104}$, $K_{104}$ and $J_{105}$, $K_{105}$, respectively, and two output terminals, designated $Q_{104}$, $\bar{Q}_{104}$ and $Q_{105}$, $\bar{Q}_{105}$, respectively, and being responsive to applied input signals in a manner similar to that of flip-flop 102. Each of bistable elements 104 and 105 additionally responds to the simultaneous application of input signals to its J and K input terminals to change its setting from one to the other of its stable states.

The interconnection of flip-flops 102, 103, 104, and 105 to provide the desired response and output signals from scale-of-four counter 101 may be made most conveniently by means of logical "and" and "or" gates, in accordance with the logical Boolean equations, $$J_{104}=[Q_{105}]Cp \qquad K_{104}=[Q_{105}]Cp \qquad (1)$$

$$J_{105}=[Q_{103}+Q_{102}]Cp \qquad K_{105}=[1]Cp \qquad (2)$$

where the right hand member of each equation defines the conditions under which an input signal is applied to the flip-flop input terminal specified by the left member of the equation, the indicated mathematical operations being logical, the "+" symbol representing the logical "or" connective, the adjunction of dissimilar signal symbols implying the logical "and" connective, and the symbol "Cp" representing synchronizing or clock pulses.

Such equations may, as more fully discussed in copending United States application for patent, Serial No. 394,441, entitled "Electronic Magnitude Comparator," by Robert Royce Johnson, filed November 25, 1953, be readily mechanized by employing diode logical "and" and "or" gates, such as those shown at pages 511 through 514 of an article entitled "Diode coincidence and mixing circuits in digital computers," by Tung Chang Chen, in "Proceedings of the I. R. E.," for May, 1950. For example, Equation 1 may be mechanized by means of a pair of two-input logical "and" gates, the $Q_{105}$ and Cp signals being applied to the two inputs of each gate, respectively, while the outputs of the gates are connected to the J and K input terminals of flip-flop 104. The logical "and" gate is responsive to the application of signals to both of its inputs for producing a signal on its output, and is thus seen to satisfy the conditions of the equation. The remaining equations may be readily mechanized in a similar manner.

When mechanized in accordance with Equations 1 and 2, it will be seen that scale-of-four counter 101 counts clock pulses modulo 4 in the sequence:

| | 104 | 105 |
|---|---|---|
| (1) | 0 | 0 |
| (2) | 0 | 1 |
| (3) | 1 | 0 |
| (4) | 1 | 1 |

whenever start-stop flip-flop 103 is set to its 0, or start state, and returns to and remains in its initial or 00 state if $(Q_{103}+Q_{102})=0$ following the fourth count.

Accordingly, output signals of relatively high voltage level corresponding to each of the four stable states of counter 101 may be taken from the counter by means of a gating matrix mechanized according to the logical Boolean equations $$V_1=\bar{Q}_{104}\cdot\bar{Q}_{105} \qquad (3)$$

$$V_2=\bar{Q}_{104}\cdot Q_{105} \qquad (4)$$

$$V_3=Q_{104}\cdot\bar{Q}_{105} \qquad (5)$$

$$V_4=Q_{104}\cdot Q_{105} \qquad (6)$$

where $V_1$, $V_2$, $V_3$, $V_4$ designate the output leads upon which the signals appear when the conditions specified are satisfied.

Ordinarily, if stop diode 25 is positioned to produce a stop signal when the last data row is in sensing position before the second reading station, start-stop flip-flop 103 will be set to its stop state during the first or second count of the final cycle of scale-of-four counter 101, thereby causing $Q_{103}$ to fall to its low level or 0 value during the first or second count. In order to provide that $(Q_{103}+Q_{102})$ does not equal 0 until the scale-of-four counter has completed its count cycle for the $(n+1)$th cycle, the inputs to column count flip-flop 102 are mechanized to provide that the flip-flop remain in its 1 state until scale-of-four counter 101 has passed to its fourth count, and be set to its 0 state by the synchronizing pulse which occurs when $V_4=1$. Since use is also made of signal $Q_{102}$ as a comparison control signal, the inputs to flip-flop 102 are additionally mechanized to provide that the flip-flop be first set to its 1 state at the beginning of the second cycle of scale-of-four counter 101.

The mechanization of the inputs to flip-flop 102 to provide the desired response may be expressed in accordance with Boolean logical notation as:

$$J_{102}=[Q_{103}V_4]Cp \qquad (7)$$

$$K_{102}=[\bar{Q}_{103}V_4]Cp \qquad (8)$$

*Electronic translating circuit*

Electronic translating circuit 400 receives data and synchronizing signals from card sensing station 10, and, operating under the control of signals supplied from electronic control circuit 100, tranlates the sensed data signals into output signals representing the data marked on the cards. As shown in Fig. 1, translating circuit 400 includes a pair of similar reading channels 410 and 411 for receiving data signals from the first and second reading stations, respectively, and for translating the signals into output signals representing the sensed data; and a comparison network 412 for comparing the output signal from reading channels 410 and 411 and indicating the results of the comparison.

More specifically, as shown in Fig. 2, reading channels 410 and 411 include code conversion matrices 420 and 421, respectively, for converting the coded signals presented by the first and second reading stations into a preferred code, and sets of reading flip-flops 430 and 431, respectively, responsive to the converted code signals, synchronizing signals from card sensing station 10 and control signals from control circuit 100 for producing voltage-level output signals representing the sensed data.

As shown in Fig. 2, each of reading stations 23 and 24 includes a photo-diode for each row of data on the card, and, therefore, for the conventional 12-row card, there will be 12 photo-diodes for each reading station. Accordingly, the output signals produced by the reading station are in 12-bit form. While it would be possible to sense and record these signals directly in 12-bit form, the present system provides that the output of translating circuit 400 be in six-bit alpha-numeric code form. A preferred code which has been found especially suitable for use with the conventional IBM card punch code and the system of the present invention is:

| Print Character | 12-Bit IBM Code | | | | | | | | | | | | 6-Bit Converted Code | | | | | |
|---|---|---|---|---|---|---|---|---|---|---|---|---|---|---|---|---|---|---|
| | X | Y | 0 | 1 | 2 | 3 | 4 | 5 | 6 | 7 | 8 | 9 | a | b | c | d | e | f |
| 0 | 0 | 0 | 1 | 0 | 0 | 0 | 0 | 0 | 0 | 0 | 0 | 0 | 0 | 0 | 0 | 0 | 0 | 0 |
| 1 | 0 | 0 | 0 | 1 | 0 | 0 | 0 | 0 | 0 | 0 | 0 | 0 | 0 | 0 | 0 | 0 | 0 | 1 |
| 2 | 0 | 0 | 0 | 0 | 1 | 0 | 0 | 0 | 0 | 0 | 0 | 0 | 0 | 0 | 0 | 0 | 1 | 0 |
| 3 | 0 | 0 | 0 | 0 | 0 | 1 | 0 | 0 | 0 | 0 | 0 | 0 | 0 | 0 | 0 | 0 | 1 | 1 |
| 4 | 0 | 0 | 0 | 0 | 0 | 0 | 1 | 0 | 0 | 0 | 0 | 0 | 0 | 0 | 0 | 1 | 0 | 0 |
| 5 | 0 | 0 | 0 | 0 | 0 | 0 | 0 | 1 | 0 | 0 | 0 | 0 | 0 | 0 | 0 | 1 | 0 | 1 |
| 6 | 0 | 0 | 0 | 0 | 0 | 0 | 0 | 0 | 1 | 0 | 0 | 0 | 0 | 0 | 0 | 1 | 1 | 0 |
| 7 | 0 | 0 | 0 | 0 | 0 | 0 | 0 | 0 | 0 | 1 | 0 | 0 | 0 | 0 | 0 | 1 | 1 | 1 |
| 8 | 0 | 0 | 0 | 0 | 0 | 0 | 0 | 0 | 0 | 0 | 1 | 0 | 0 | 0 | 1 | 0 | 0 | 0 |
| 9 | 0 | 0 | 0 | 0 | 0 | 0 | 0 | 0 | 0 | 0 | 0 | 1 | 0 | 0 | 1 | 0 | 0 | 1 |
| A | 0 | 1 | 0 | 1 | 0 | 0 | 0 | 0 | 0 | 0 | 0 | 0 | 0 | 1 | 0 | 0 | 0 | 1 |
| B | 0 | 1 | 0 | 0 | 1 | 0 | 0 | 0 | 0 | 0 | 0 | 0 | 0 | 1 | 0 | 0 | 1 | 0 |
| C | 0 | 1 | 0 | 0 | 0 | 1 | 0 | 0 | 0 | 0 | 0 | 0 | 0 | 1 | 0 | 0 | 1 | 1 |
| D | 0 | 1 | 0 | 0 | 0 | 0 | 1 | 0 | 0 | 0 | 0 | 0 | 0 | 1 | 0 | 1 | 0 | 0 |
| E | 0 | 1 | 0 | 0 | 0 | 0 | 0 | 1 | 0 | 0 | 0 | 0 | 0 | 1 | 0 | 1 | 0 | 1 |
| F | 0 | 1 | 0 | 0 | 0 | 0 | 0 | 0 | 1 | 0 | 0 | 0 | 0 | 1 | 0 | 1 | 1 | 0 |
| G | 0 | 1 | 0 | 0 | 0 | 0 | 0 | 0 | 0 | 1 | 0 | 0 | 0 | 1 | 0 | 1 | 1 | 1 |
| H | 0 | 1 | 0 | 0 | 0 | 0 | 0 | 0 | 0 | 0 | 1 | 0 | 0 | 1 | 1 | 0 | 0 | 0 |
| I | 0 | 1 | 0 | 0 | 0 | 0 | 0 | 0 | 0 | 0 | 0 | 1 | 0 | 1 | 1 | 0 | 0 | 1 |
| J | 1 | 0 | 0 | 1 | 0 | 0 | 0 | 0 | 0 | 0 | 0 | 0 | 1 | 0 | 0 | 0 | 0 | 1 |
| K | 1 | 0 | 0 | 0 | 1 | 0 | 0 | 0 | 0 | 0 | 0 | 0 | 1 | 0 | 0 | 0 | 1 | 0 |
| L | 1 | 0 | 0 | 0 | 0 | 1 | 0 | 0 | 0 | 0 | 0 | 0 | 1 | 0 | 0 | 0 | 1 | 1 |
| M | 1 | 0 | 0 | 0 | 0 | 0 | 1 | 0 | 0 | 0 | 0 | 0 | 1 | 0 | 0 | 1 | 0 | 0 |
| N | 1 | 0 | 0 | 0 | 0 | 0 | 0 | 1 | 0 | 0 | 0 | 0 | 1 | 0 | 0 | 1 | 0 | 1 |
| O | 1 | 0 | 0 | 0 | 0 | 0 | 0 | 0 | 1 | 0 | 0 | 0 | 1 | 0 | 0 | 1 | 1 | 0 |
| P | 1 | 0 | 0 | 0 | 0 | 0 | 0 | 0 | 0 | 1 | 0 | 0 | 1 | 0 | 0 | 1 | 1 | 1 |
| Q | 1 | 0 | 0 | 0 | 0 | 0 | 0 | 0 | 0 | 0 | 1 | 0 | 1 | 0 | 1 | 0 | 0 | 0 |
| R | 1 | 0 | 0 | 0 | 0 | 0 | 0 | 0 | 0 | 0 | 0 | 1 | 1 | 0 | 1 | 0 | 0 | 1 |
| S | 0 | 0 | 1 | 0 | 1 | 0 | 0 | 0 | 0 | 0 | 0 | 0 | 1 | 1 | 0 | 0 | 1 | 0 |
| T | 0 | 0 | 1 | 0 | 0 | 1 | 0 | 0 | 0 | 0 | 0 | 0 | 1 | 1 | 0 | 0 | 1 | 1 |
| U | 0 | 0 | 1 | 0 | 0 | 0 | 1 | 0 | 0 | 0 | 0 | 0 | 1 | 1 | 0 | 1 | 0 | 0 |
| V | 0 | 0 | 1 | 0 | 0 | 0 | 0 | 1 | 0 | 0 | 0 | 0 | 1 | 1 | 0 | 1 | 0 | 1 |
| W | 0 | 0 | 1 | 0 | 0 | 0 | 0 | 0 | 1 | 0 | 0 | 0 | 1 | 1 | 0 | 1 | 1 | 0 |
| X | 0 | 0 | 1 | 0 | 0 | 0 | 0 | 0 | 0 | 1 | 0 | 0 | 1 | 1 | 0 | 1 | 1 | 1 |
| Y | 0 | 0 | 1 | 0 | 0 | 0 | 0 | 0 | 0 | 0 | 1 | 0 | 1 | 1 | 1 | 0 | 0 | 0 |
| Z | 0 | 0 | 1 | 0 | 0 | 0 | 0 | 0 | 0 | 0 | 0 | 1 | 1 | 1 | 1 | 0 | 0 | 1 |
| Blank | Blank | | | | | | | | | | | | 0 | 0 | 1 | 0 | 1 | 0 |
| / | 0 | 1 | 0 | 0 | 0 | 0 | 0 | 0 | 0 | 0 | 0 | 0 | 0 | 1 | 1 | 0 | 1 | 0 |
| - | 1 | 0 | 0 | 0 | 0 | 0 | 0 | 0 | 0 | 0 | 0 | 0 | 1 | 0 | 1 | 0 | 1 | 0 |
| & | 0 | 0 | 1 | 1 | 0 | 0 | 0 | 0 | 0 | 0 | 0 | 0 | 1 | 1 | 0 | 0 | 0 | 1 |
| @ | 0 | 0 | 0 | 0 | 0 | 1 | 0 | 0 | 0 | 0 | 1 | 0 | 0 | 0 | 1 | 0 | 1 | 1 |
| ⌑ | 0 | 0 | 0 | 0 | 0 | 0 | 1 | 0 | 0 | 0 | 1 | 0 | 0 | 0 | 1 | 1 | 0 | 0 |
| . | 0 | 1 | 0 | 0 | 0 | 1 | 0 | 0 | 0 | 0 | 1 | 0 | 0 | 1 | 1 | 0 | 1 | 1 |
| # | 0 | 1 | 0 | 0 | 0 | 0 | 1 | 0 | 0 | 0 | 1 | 0 | 0 | 1 | 1 | 1 | 0 | 0 |
| $ | 1 | 0 | 0 | 0 | 0 | 1 | 0 | 0 | 0 | 0 | 1 | 0 | 1 | 0 | 1 | 0 | 1 | 1 |
| * | 1 | 0 | 0 | 0 | 0 | 0 | 1 | 0 | 0 | 0 | 1 | 0 | 1 | 0 | 1 | 1 | 0 | 0 |
| , | 0 | 0 | 1 | 0 | 0 | 1 | 0 | 0 | 0 | 0 | 1 | 0 | 1 | 1 | 1 | 0 | 1 | 1 |
| % | 0 | 0 | 1 | 0 | 0 | 0 | 1 | 0 | 0 | 0 | 1 | 0 | 1 | 1 | 1 | 1 | 0 | 0 |

As will be readily understood, the required circuitry for translating circuit 400 may be considerably simplified if the desired code conversion is carried out prior to further signal translation. Accordingly, the signals from the first and second reading stations are fed directly to conversion matrices 420 and 421.

One form of conversion matrix 420 for carrying out the conversion according to the above code is shown in Fig. 3*b*, together with a card illustrating the punching of a particular symbol of the code which is read (Fig. 3*a*). As shown in Fig. 3*b*, conversion matrix 410 includes a plurality of input leads, X, Y, and 0 through 9 for receiving output signals from the photo-diodes associated with the corresponding card rows, respectively, a logical gating matrix 99, and a plurality of output terminals $L_a$, $L_b$, $L_c$, $L_d$, $L_e$, and $L_f$ for presenting signals representing the sensed data.

The input signals corresponding to a particular card column appear at the 12 input terminals simultaneously, a punched area of the card producing a signal of relatively high voltage level on the corresponding input lead, while an unpunched area of the card produces a signal of relatively low voltage level. The logical gating matrix is mechanized to respond to the applied input signals in accordance with the logical Boolean equations:

$$L_a=X+0(1+2+3+4+5+6+7+8+9) \quad (9)$$

$$L_b=Y+0(1+2+3+4+5+6+7+8+9) \quad (10)$$

$$L_c=8+9+\overline{(0+1+2+3+4+5+6+7+8+9)} \quad (11)$$

$$L_d=4+5+6+7 \quad (12)$$

$$L_e=2+3+6+7+\overline{(0+1+2+3+4+5+6+7+8+9)} \quad (13)$$

$$L_f=1+3+5+7+9 \quad (14)$$

where the right hand member of each equation defines the conditions under which a signal of relatively high voltage level appears on the corresponding output lead, the indicated mathematical operations being logical, the "+" symbol representing the logical "or" connective, the adjunction of dissimilar symbols implying the logical "and" connective, and the super bar indicating the complementing of the term covered by the bar. These equations may be mechanized in a manner similar to that discussed hereinabove for the control circuit equations. Conversion matrix 421 may be identical to matrix 420.

The operation of the conversion matrices may be better understood by considering the response of the matrix to a particular set of input signals. For example, the asterisk symbol, as shown in Fig. 3*a*, is indicated according to the conventional IBM punched code by a punch mark in the X, 8, and 4 positions of a particular column. The sensing of such a column will produce 1 or high-level signals on the X, 8, and 4 input leads, and 0 or low-level signals on the remaining input leads; accordingly, the response of the matrix will be $L_a=1$ $L_d=1$
$L_b=0$ $L_e=0$
$L_c=1$ $L_f=0$ which is the six-bit code group adopted for the asterisk symbol.

It should be noted that the signals which appear at the output terminals of conversion matrices 420 and 421 do not distinguish between data bearing and non-data bearing portions of a card passing through the system. For example, the signals appearing at the output terminals when an area between data columns is sensed is identical to the signals appearing when an unpunched or blank data column is sensed. It will be understood from the previous discussion, however, that the synchronizing and control signals do uniquely define intervals during which data signals appear at the conversion matrix output terminals. Accordingly, use may be made of an appropriate control signal for selecting a synchronizing pulse to sense the output of the conversion matrix and set up the reading flip-flop to indicate the sensed data.

Returning now to Fig. 2, each of the reading flip-flop sets 430 and 431 includes six bistable elements, which may be similar to the Eccles-Jordan multivibrators heretofore described. The input circuits associated with each set of flip-flops are designed to provide that these flip-flops be set to an initial state prior to the presentation of signals corresponding to a particular data column on the card, and that the flip-flop be set to indicate the converted data signals during the interval in which such signals are presented at the output of the conversion matrices.

According to one preferred embodiment of the invention, wherein the first and second reading stations are displaced one column width, the input circuits to reading flip-flop sets 430 and 431 may be mechanized to provide that the flip-flops be set to their 0 or initial state by the synchronizing pulse which occurs during the interval that signal $V_1=1$, and that the flip-flops be set in accordance with the data signals presented by their respective conversion matrices by the synchronizing pulse which occurs during the interval $V_2=1$.

The above response may be achieved by mechanizing the inputs to reading flip-flop set 430 according to the logical equations $$K_{a,b,c,d,e,f}=(V_1)Cp \quad (15)$$

$$J_a=L_a(V_2)Cp \quad (16)$$

$$J_b=L_b(V_2)Cp \quad (17)$$

$$J_c=L_c(V_2)Cp \quad (18)$$

$$J_d=L_d(V_2)Cp \quad (19)$$

$$J_e=L_e(V_2)Cp \quad (20)$$

$$J_f=L_f(V_2)Cp \quad (21)$$

where the logical equations have the significance heretofore noted. These equations may be mechanized in a manner similar to the previously discussed logical equations. For example, Equation 16 may be mechanized by means of a three-input logical "and" gate, the "and" gate being responsive to the application of input signals to all of its inputs for producing an output signal on its output terminal. The inputs of the gate are connected to receive the $L_a$ data signal, the $V_2$ control signal, and the synchronizing pulses, respectively, while the output terminal is connected to the $J_a$ input terminal of reading set 430. The remaining inputs may be mechanized in a similar manner.

The inputs to reading flip-flop set 431 may be mechanized in accordance with a similar set of equations, using the output signals from conversion matrix 421 as the data signals for the input gates.

It should be noted that output signals corresponding to a particular data column on the card appear at the output terminals of reading flip-flop set 431 one column width in time later than the same signals appear at the output terminals of reading set 430. In order to provide that the signals corresponding to a particular data column be available during the same time interval so that the comparison operation may be carried out, the signals from reading flip-flop set 430 may be delayed by means of an appropriately introduced delay circuit. The pulsed gating scheme of the present invention lends itself particularly to the use of an additional set of conventional Eccles-Jordan multivibrators as such a delay circuit.

Accordingly, as shown in Fig. 2, reading channel 410 includes an additional set 432 of storage flip-flops for receiving input data signals from the output circuits of reading set 430, and for storing these signals for one column width interval in time. More particularly, storage flip-flop set 432 includes six bistable elements, one for each of the bistable elements in reading set 430. The input circuits associated with each flip-flop receive input signals from the output circuits of the corresponding flip-flop in set 430, synchronizing pulses and the $V_4$ control signal, and provide that the flip-flop be responsive to such signals to set to the state of the corresponding flip-flop in set 430 during the interval that signal $V_4=1$.

The above response may be provided by mechanizing the input circuits of each flip-flop in set 432 in accordance with the logical Boolean equations, $$J=[Q_xV_4]Cp \quad (22)$$

$$K=[\overline{Q}_xV_4]Cp \quad (23)$$

where J and K are the input terminals for the particular flip-flop in set 432, and $Q_x$ and $\overline{Q}_x$ are the output signals from the corresponding flip-flop in set 430. It should be noted that under the above mechanization of the inputs to storage set 432, there is no provision for returning the flip-flops to an initial state between the application of successive input data signals to the flip-flops, and accordingly, the output signals from the flip-flops are of a full column width duration.

As will be described in more detail hereinafter, the output signals from flip-flop sets 431 and 432 may be applied to a comparator network to determine the fidelity of the card reading operation for the particular column of data duplicated in these sets. In addition, the output signals from flip-flop set 432 may be directly utilized in conjunction with the signals from flip-flop 104 to form a signal directly recordable according to the Manchester system of magnetic recording, utilizing a system similar to that shown in copending United States patent application, Serial No. 460,965, entitled "Magnetic Writing Circuits," by D. L. Curtis, filed October 7, 1954.

It may be recalled that according to another embodiment of the invention, the first and second reading stations may be displaced one quarter of one column width apart. Assuming that this is done, the inputs to reading flip-flop set 430 may be mechanized as set forth by Equations 15 through 21, while the inputs to reading flip-flop set 431 may be mechanized in accordance with the logical equations, $$K_{a,b,c,d,e,f}=(V_2)Cp \quad (24)$$

$$J_a=L_a(V_3)Cp \quad (25)$$

$$J_b=L_b(V_3)Cp \quad (26)$$

$$J_c=L_c(V_3)Cp \quad (27)$$

$$J_d=L_d(V_3)Cp \quad (28)$$

$$J_e = L_e(V_3)Cp \quad (29)$$

$$J_f = L_f(V_3)Cp \quad (30)$$

where the logical equations have the significance heretofore noted.

It will be recognized that when flip-flop set 431 is mechanized in accordance with these equations, output signals corresponding to the same data row are presented at the output terminals of flip-flop sets 430 and 431 during the interval when signal $V_4=1$. Accordingly, no additional delay, such as that previously provided by flip-flop set 432, need be introduced prior to the comparison of such signals during this interval.

*Comparison network*

Comparison network 412 is included within electronic translating circuit 400 in order to provide a self-checking feature for the system by comparing the output signals from reading channels 410 and 411 to indicate the identity or non-identity of the compared signals. Referring now to Fig. 4, there is shown a block diagram of one form of the comparison network which may be employed with the present invention. As shown in Fig. 4, comparison network 412 includes a comparison matrix 440 for receiving voltage level data signal sets from reading channels 410 and 411, respectively, and for producing an output signal indicating the identity or non-identity of the received signal sets, and a comparison indicator flip-flop 441, responsive to signals from matrix 440, electronic control circuit 100 and to the synchronizing pulses, for indicating the result of the comparison operation.

More particularly, comparison matrix 440 is a diode voltage level gating matrix having first and second sets of input terminals, and being responsive to the simultaneous application of similar input signals to corresponding input terminals of said first and second sets for producing an output signal. As shown in Fig. 4, matrix 440 includes a first set of input terminals $C_1, C_2, \ldots C_6$ for receiving delayed input signals from reading channel 410, a second set of input terminals $C_7, C_8, \ldots C_{12}$ for receiving input signals from reading channel 411, and an output terminal $C_v$ for presenting an output signal when corresponding input signals are identical. The structural mechanization of matrix 440 to respond in such a manner may be most conveniently described by means of the logical Boolean equation, $$C_v = (C_1C_7 + \bar{C}_1\bar{C}_7)(C_2C_8 + \bar{C}_2\bar{C}_8)(C_3C_9 + \bar{C}_3\bar{C}_9)(C_4C_{10} + \bar{C}_4\bar{C}_{10})(C_5C_{11} + \bar{C}_5\bar{C}_{11})(C_6C_{12} + \bar{C}_6\bar{C}_{12}) \quad (31)$$

where the terms have the signficance heretofore noted.

Comparison indicator flip-flop 441, which may be a conventional Eccles-Jordan multivibrator similar to that theretofore described, is normally set to its 0 state except during the comparison interval, when the flip-flop is set to its 1 state if the signals received from reading channels 410 and 411 are identical. If the applied signal sets are not identical, indicator flip-flop 441 remains in its 0 state throughout the comparison interval, thereby indicating a non-identity and the occurrence of an error or malfunction within the system.

The above response may be provided by mechanizing the input circuits of indicator flip-flop 441 in accordance with the following logical equations:

$$J_{441} = [C_vV_3Q_{102}]Cp \quad (32)$$

$$K_{441} = [1]Cp \quad (33)$$

*Operation*

Considering now the operation of the electronic data translating system of the invention, there is shown in Fig. 5 a composite diagram of the waveforms of electrical signals appearing at various points in the system according to Fig. 2, prior to, during, and after the passage of a data card through card sensing station 10. The waveforms have been drawn with amplitudes disposed along the vertical axis, and time extending along the horizontal axis.

The system may be placed in operation by applying power to the various elements, and starting the card transport system drive motor. Initially, all of the bistable elements in the system may be set to their 0 state by means of a reset mechanism, not shown. Upon setting the system in operation, synchronizing signal generating circuit 13 will produce output synchronizing pulses 31, as shown in Fig. 5. With scale-of-four counter 101 set to its initial or 00 state, output signals $\bar{Q}_{104}$ and $\bar{Q}_{105}$ will be at their 1 or relatively high voltage levels 502 and 503, respectively, and $V_1$, which according to logical notation equals $\bar{Q}_{104}\bar{Q}_{105}$, will also be at its 1 level. Accordingly, the synchronizing pulses will be routed to the K input terminals of the flip-flops in reading sets 430 and 431, and the K input terminal of comparison flip-flop 441, and these flip-flops will remain in their 0 states.

At the same time, since both start-stop flip-flop 103 and column count flip-flop 102 have been set to their 0 states, output signals $Q_{103}$ and $Q_{102}$ will be at relatively low voltage levels. Accordingly, scale-of-four counter 101 will receive input signals tending to set the counter to its 00 or initial state, and the counter will, therefore, remain in its initial state. Consequently, the $V_1$ control signal produced by electronic control circuit 100 will also remain at its 1 or high level, and the system will be locked in a stable initial state prior to the receipt of a data bearing card.

Assuming now that a data bearing card is introduced into the card feeding system, the mode of response outlined above will continue until the card is moved into a position such that its leading edge is sensed by start diode 22, at which time the first reading station 23 will also begin to sense the first data column on the card. The sensing of the leading edge of the card by start diode 22 causes output signal 57 from the photo-diode to fall from its high value 58 to a low value 59, as shown in Fig. 5, this change of signal level in turn triggering start blocking oscillator 1010 to produce a negative output pulse 60, which in turn sets start-stop flip-flop 103 to its start state. When in its start state, flip-flop 103 produces a 1 or relatively high level output signal 502 on its $Q_{103}$ output terminal, and the data sensing cycle of the system is begun.

It should be noted that since a card may be entered into the system at any time, the instant at which the leading edge of the card is sensed by start photo-diode 22, which is illustrated in Fig. 5 by the time $t_1$, may actually occur simultaneously with the generation of a synchronizing pulse, or may occur during an interval between synchronizing pulses. The relative positions of the start pulse and the synchronizing pulses does not, however, affect the overall operation of the system, but results merely in a shift with respect to the synchronizing pulses and the signals initiated thereby, of the control and data signals from photo-diode reading and control matrix 12. Since the first synchronizing pulse following the setting of start-stop flip-flop 103 to its start state will initiate the cycling of scale-of-four counter 101, the time shift due to random entry of the cards into the system will be at most one synchronizing pulse interval, corresponding to one-fourth of a card column width. As will be pointed out in greater detail later, the data signals corresponding to a particular column of data are available from photo-diode matrix 12 for slightly more than two synchronizing pulse intervals. Accordingly, no error is introduced due to the random entry of cards into the system.

It may be recalled that the setting of start-stop flip-flop 103 to its start state initiates the cycling of scale-of-four counter 101. Accordingly, the first synchronizing pulse following the setting of flip-flop 103 to its start state will set the counter to its 01 state. With flip-flop 104 in its 0 state ($\bar{Q}_{104}=1$) and flip-flop 105 in its 1 state ($Q_{105}=1$), the conditions for $V_2=1$ will be satisfied, and signal $V_2$ will rise to its 1 level while signal $V_1$ falls to its 0 level. However, due to the finite time of response of conventional bistable elements, the first synchronizing pulse will be applied to the various gates of the system before $V_1$ has fallen from its 1 to 0 level, or $V_2$ has risen to its 1 level, and therefore the first synchronizing pulse will be gated by the $V_1$ signal to perform the reset function previously described for flip-flop set 430 in reading channel 410, as indicated by Equation 15, and for flip-flop set 431 if it is assumed the photo-diode reading stations are positioned one column width apart.

Meanwhile, the card transport system will continue to move the card forward past photo-diode reading and control matrix 12, and the first sensing station will begin to sense the first data row on the card, producing output signals in accordance with the punching of each of the 12 rows of the card. In order to simplify the operational description of the electronic data translating system of the invention, only the output signal waveshape for a single photo-diode of the first reading station is shown in Fig. 5, it being understood that similar output signals will be produced for each of the remaining photo-diodes of the station in accordance with the data punching for their respective data rows. The waveshape of the signal from the single diode is illustrated in Fig. 5 by the waveform 506 which may also be considered to represent the signal appearing at one of the output terminals of conversion matrix 420, if it is assumed that the conversion function of the matrix for the particular diode row and output terminal implies a direct connection. If it is assumed, for example, that signal 506 represents the output signal from the X photo-diode in the first reading station, it is clear from Equation 9 that signal 506 is also representative of signal $L_a$ from conversion matrix 420.

Returning now to the operation of the system, as shown in Fig. 5 signal 506 will be at a relatively low level 507, corresponding to the scanning of an unpunched area of the card, immediately prior to the scanning of the first data column punched on the card. Simultaneously with the generation of start signal 60, the first reading station will begin to sense the first data column on the card. Signal 506, representing the response to a punched mark in the first data column, will rise to its relatively high level value as indicated by reference character 508. It will be recognized that if the sensing photo-diodes of the first reading station are of substantially smaller width than the card punched hole width, signal 506 will rise to its high level sharply. Similarly, since the card punched hole is ordinarily slightly wider than ⅔ of a column width, signal 506 will remain at its relatively high level value for slightly longer than two synchronizing pulse intervals.

Accordingly, with $V_2=1$, the second synchronizing pulse following the start signal will sense signal 506, now representing a matrix output signal, and set the corresponding flip-flop of reading flip-flop set 430 to its 1 state. A similar setting operation will take place for each of the remaining flip-flops in set 430, in accordance with their respective input signals. For the sake of simplicity, only the output signal from the flip-flop which received input signal 506 is shown, this signal being labeled 510. Accordingly, at the instant of the second synchronizing pulse, signal 510 will rise from its 0 or low level to its 1 or high level, as indicated in Fig. 5 by the reference characters 511 and 512, respectively.

During the interval in which the first reading station senses the first data column on the card, it is clear that the second reading station will be sensing an unpunched area of the card. Accordingly, signal 514, which represents the output signal for the second reading station photo-diode which corresponds to the photo-diode which produces signal 506, will be at a relatively low level 515. It will again be assumed that signal 514 in a manner similar to that described for signal 506, is considered to represent one of the output signals of conversion matrix 421. Since this output signal is similarly at a low level, the corresponding flip-flop in reading set 431 will not be set to its 1 state, and its output signal 517 will therefore remain at a relatively low level 518.

The second synchronizing signal will also set scale-of-four counter 101 to its 10 state, and the $V_3$ output signal will rise to its 1 level. Ordinarily, use will be made of the third synchronizing pulse during the $V_3$ signal interval to sense the output of comparison matrix 440 and set comparison flip-flop 441 accordingly. However, since column count flip-flop 102 is still in its 0 state, its output signal $Q_{102}$ remains at its low level, designated 520 in Fig. 5. Accordingly, comparison flip-flop 441 will remain in its 0 state, and its output signal, which is designated by the waveform 540 in Fig. 5, will remain at its low level.

The third synchronizing signal will, in turn, set scale-of-four counter 101 to its fourth or 11 state, and $V_4$ will rise to its 1 level, which in turn gates the fourth synchronizing pulse to set column count flip-flop $Q_{102}$ to its 1 state, producing a relatively high voltage level signal 521 on its $Q_{102}$ output terminal. The $V_4$ control signal at its high level value will also gate the fourth synchronizing pulse to set each flip-flop in storage set 432 to the state of its corresponding flip-flop in reading flip-flop set 430. Accordingly, the output signal from the flip-flop in set 432 which corresponds to the flip-flop in set 430 which produces output waveshape 510, will be set to its 1 level as indicated by the waveform designated 532.

The fourth synchronizing pulse will also return scale-of-four counter 101 to its initial or 00 state, and the system will respond to further synchronizing pulses by repeating the cycle of operations previously outlined. However, since $Q_{102}$ has now been set to its 1 state, the comparison function of the system will be carried out during the $V_3$ interval of the second and each succeeding cycle. More particularly, the first synchronizing pulse of the second cycle will carry out the reset functions previously outlined, and also set counter 101 to its 01 state, whereat $V_2=1$. Meanwhile, the card being sensed will have moved through the system so that its first data row is now before the second reading station, while its second data row is before the first reading station. Consequently, the second reading station now senses the row previously sensed by the first reading station, and signal 514 will rise to its 1 or high level, designated 516 in Fig. 5. It will be recognized that the waveshape of signal 514 corresponds, under the assumptions previously noted, to waveshape 506 delayed one column width in time.

The second synchronizing pulse of the second cycle is combined with the $V_2$ control signal in accordance with Equations 16 through 21 to set flip-flop set 430 to indicate the second column of data now sensed by the first reading station, while set 431 is simultaneously set to indicate the first column of data which is now being sensed by the second reading station. Waveshape 517, which is representative of the output of flip-flop set 431 in the sense heretofore noted, will therefore rise to its 1 or high level 519. It should be noted that signal waveform 517 corresponds to waveform 510 delayed one column width in time.

The second synchronizing pulse of the second cycle will also set counter 101 to its third state, whereat $V_3=1$. Since signal $Q_{102}$ is now at its high level, it will be recognized from Equation 32 that the comparison function of the system will be carried out upon receipt of the next synchronizing pulse. It will also be recognized that reading set 431 and storage set 432 each have been set to indicate the information gained from sensing the first data column on the card, storage set 432 holding the information as sensed by the first reading station, while reading set 431 holds the information as sensed by the second reading station. It will be recalled that if these two sets of data are identical, comparison matrix 440 will produce a high level output signal $C_v$ in accordance with Equation 31. It will be noted from Fig. 5 that these conditions are satisfied during the interval of the second cycle when signal $V_3$ is 1, since both signal 517 and 530 are at their high levels 519 and 532, respectively. Accordingly, the third synchronizing signal is combined with comparison signal $C_v$, and signals $V_3$ and $Q_{105}$, in accordance with Equation 32, and is applied to the J input of comparison flip-flop 441 to set the flip-flop to its 1 state, and thereby cause its output signal 540 to rise to its high level value 541, as shown in Fig. 5, to indicate comparison.

It is clear that if the output signal $C_v$ of comparison matrix 440 remains at its 0 level corresponding to the application of non-identical input signals to the comparison matrix, the third synchronizing pulse will not be gated to the J input of flip-flop 441, and the flip-flop will remain in its 0 state, thereby indicating that an error or malfunction has occurred within the system. If it is assumed that the data stored in flip-flop sets 431 and 432 is identical, the fourth synchronizing pulse of the second cycle, functions as previously recited to recycle counter 101, and in addition, to reset comparison flip-flop 441 to its 0 state. It will also be recognized that the fourth synchronizing pulse may be combined with the high level output signal from flip-flop 441 to gate the signals stored in either of flip-flop sets 431 or 432 to a suitable recording system. The cycle of operations thus outlined will be repeated for each succeeding column of data on the card until each of the columns of data on the card has been sensed by both reading stations, and the appropriate translation operations performed.

As previously discussed, in order to complete the sensing of all columns of data on a card by both reading stations, scale-of-four counter 101 must go through $(n+1)$ cycles, where $n$ is the number of data columns on the card. During the $(n+1)$st cycle, the second reading station will sense the final data column of the card, while the first reading station will sense the unpunched area of the card between the last data column and the trailing edge of the card. Since the operation of electronic translating circuit 400 during the final cycle corresponds to the response previously outlined for the second cycle, no further description will be made of the operation of this portion of the system.

The response of electronic control circuit 100, however, is modified during the $(n+1)$st cycle in order to inhibit the further response of the control circuit upon the completion of the cycle and thereby discontinue the translating function of the electronic translating circuit. More particularly, as the last data column on the card is sensed by the second reading station and produces waveshape 580 of signal 514, stop diode 25 senses the trailing edge of the card, and the output signal 62 of the diode rises from a low level 63 to a high level 64. This change of signal level in turn triggers stop blocking oscillator 1011 to produce a negative output pulse 61, which resets start-stop flip-flop 103 to its stop state, thereby causing its output signal $Q_{103}$ to fall from its 1 or high level 502 to its 0 or low level 501.

The setting of start-stop flip-flop 103 to its stop state will not, however, inhibit the continued response of scale-of-four counter 101, since, as will be seen from Equation 2, the J input of flip-flop 105 continues to receive synchronizing pulse input signals so long as either of signals $Q_{103}$ or $Q_{102}$ is at its 1 or high level. Accordingly, scale-of-four counter 101 responds to the second, third and fourth synchronizing pulses of the final cycle by setting to its 10, 11, and 00 states, respectively.

With start-stop flip-flop 103 in its 0 state, its $\bar{Q}_{103}$ output signal will be at a 1 or high level, and accordingly, the fourth synchronizing pulse of the final cycle will also be combined with signal $\bar{Q}_{103}$ and signal $V_4$ in accordance with Equation 8 to reset column count flip-flop 102 to its 0 state, thereby causing its output signal $Q_{102}$ to fall to its 0 level 523.

It will thus be seen that both start-stop flip-flop 103 and column count flip-flop 102 are now in their 0 states, and accordingly, the conditions for the application of synchronizing pulses to the J input of flip-flop 105, as specified by Equation 2, are no longer satisfied. Accordingly, scale-of-four counter 101 will continue to receive synchronizing pulses only on the input of flip-flop 105, and the counter will therefore remain in its 00 or initial state.

This state, and the state of all remaining elements in the system will be seen to correspond to the initial state previously described prior to the receipt of the first card. Accordingly, the system is now ready to receive the next card to be sensed, whereupon the operational cycle outlined will be repeated.

What is claimed as new is:

1. In an electronic data translating system for sensing moving data-bearing cards to produce electrical output signals representing the sensed data in accordance with the displacement of the card through the system, the combination comprising: means for moving a data bearing card at substantially constant velocity in a direction defined by the rows of data on the card, and at right angles to the columns of data on the card; first and second reading stations for sensing the data marked on the cards and producing first and second sets of data signals for each data column on the card, said first and second reading stations each including a plurality of sensing devices displaced in columnar form for simultaneously sensing a plurality of data rows on the cards; means for sensing the relative position of the card to produce a start output signal when the first data column on the card is in sensing position before said first reading station; and means for sensing the relative position of the card to produce a stop output signal when the last data column is in sensing position before said second reading station.

2. The combination defined in claim 1, including means coupled to said card moving means for generating a plurality of substantially uniformly time-spaced synchronizing pulses during the interval of time required to move a card one column width.

3. The combination defined in claim 1, including a synchronizing signal generating circuit, coupled to said card moving means, for producing a plurality of uniformly time-spaced synchronizing pulses when said card moving means moves an amount equivalent to one column width motion of a data card.

4. In an electronic data translating system for photoelectrically scanning multi-column punched data cards column by column as the card moves through the system, and producing electrical output signals representing the sensed data in accordance with the displacement of the card through the system, the combination comprising: a card sensing station for scanning a moving data card column by column, said station including means for sensing each data column twice and producing two sets of data signals for each data column on the card, means for sensing the passage of the leading and trailing edge of the card, respectively, and producing control signals in accordance therewith, and synchronizing signal generating means for producing a plurality of uniformly spaced synchronizing signals in accordance with the displacement of the card one column width through the system; an electronic control circuit responsive to said control signals and said synchronizing signals for cyclically producing a series of output control signals, one output control signal for each synchronizing signal; and an electronic translating device including means for converting each set of data signals to another set according to a predetermined code, means, responsive to the converted data signals, said synchronizing signals and said output control signals, for producing two sets of voltage level output signals representing said sensed data, and means, responsive to said synchronizing signals and said output control signals, for comparing said two sets of voltage level output signals and producing an output signal indicating the result of the comparison.

5. The combination defined in claim 4, wherein said electronic control circuit includes a modulo-$x$ counter, where $x$ is the number of synchronizing signals per column width produced by the synchronizing signal generating means, for counting said synchronizing signals and cyclically producing $x$ output control signals, one for each count of the counter; means responsive to the control signal produced by said leading edge sensing means for initiating the counting of signals by said counter; and means responsive to the control signal produced by said trailing edge sensing means for locking said counter in its initial state.

6. The combination defined in claim 4, wherein said electronic control circuit includes a modulo-$x$ counter, where $x$ is the number of synchronizing signals produced by the synchronizing signal generating means per column width, said counter having $x$ output terminals, one for each count of the counter, upon which an output control signal appears when the counter is in the corresponding stable state; first means responsive to said synchronizing signals for advancing the count of said counter one count for each synchronizing signal; second means responsive to said start control signal for rendering said first means operable; and third means, responsive to said stop control signal for rendering said first means inoperable when said counter returns to its initial state.

7. The combination defined in claim 6 wherein said third means is responsive to said stop control signal, one of said output control signals and said synchronizing signals for rendering said first means inoperable after said counter has completed the count cycle during which said stop signal occurs and has returned to its initial state.

8. The combination defined in claim 4, wherein said means for converting each set of data signals to another set according to a predetermined code includes a logical gating network having a plurality of input circuits, including one input circuit for each data row on the card; a plurality of output circuits, including one output circuit for each digit of said predetermined code, and means interconnecting said input and output circuits, said last named means including logical "and," "or" and complementing circuits interconnecting said input and output circuits.

9. The combination defined in claim 4, wherein said means for converting each set of data signals to another set according to a predetermined code includes a logical gating network having twelve input circuits, one for each data row on the card, six output circuits, one for each digit of said predetermined code, and a plurality of logical gates interconnecting said input and output circuits.

10. The combination defined in claim 9, wherein said plurality of logical gates interconnecting said input and output circuits includes logical "and," "or" and complementing circuits mechanizing the response of said logical gating networks in accordance with the logical equations:

$$L_a = X + 0(1+2+3+4+5+6+7+8+9)$$
$$L_b = Y + 0(1+2+3+4+5+6+7+8+9)$$
$$L_c = 8+9+(\overline{0+1+2+3+4+5+6+7+8+9})$$
$$L_d = 4+5+6+7$$
$$L_e = 2+3+6+7+(\overline{0+1+2+3+4+5+6+7+8+9})$$
$$L_f = 1+3+5+7+9$$

wherein $L_a$, $L_b$, $L_c$, $L_d$, $L_e$, and $L_f$ represent the six output circuits, respectively; X, Y, and 0 through 9, represent the twelve input circuits, respectively; the "+" symbol the logical "or" connective; the adjunction of dissimilar symbols the logical "and" connective; the super bar the complementing of the term covered by the bar; and the right hand member of each equation defines the conditions under which a signal appears on the corresponding output circuits.

11. The combination defined in claim 4, wherein said means responsive to the converted data signals, said synchronizing signals, and said output control signals for producing two sets of voltage level output signals representing said sensed data includes two sets of reading flip-flops, each of said sets including one flip-flop for each digit of said converted data signal set, said flip-flop having first and second input terminals and first and second output terminals, and being responsive to signals applied to said first input terminal for producing a voltage level output signal on said first output terminal and to signals applied to said second input terminal for producing a voltage level output signal on said second output terminal; means for applying said synchronizing signals, said output control signals and said converted data signals to the first input terminal of the corresponding flip-flop; and means for applying said synchronizing signals and said output control signals to the second input terminals of all of said flip-flops.

12. The combination defined in claim 4, wherein said means responsive to the converted data signals, said synchronizing signals, and said output control signals for producing two sets of voltage level output signals representing said sensed data includes two sets of reading flip-flops, each flip-flop having a first input terminal for receiving a corresponding converted data signal, said output control signals, and said synchronizing signals, a second input terminal for receiving others of said output control signals and said synchronizing signals, and first and second output terminals, and being responsive to signals applied to said first input terminal for producing a voltage level output signal on said first output terminal, and to signals applied to said second input terminal for producing a voltage level output signal on said second output terminal.

13. The combination defined in claim 4, wherein one of said means responsive to the converted data signals, said synchronizing signals and said output control means includes additional delay means for delaying the production of said voltage level output signals, whereby said two sets of voltage level control signals representing the sensed data for a particular row are made available simultaneously for at least one synchronizing pulse period.

14. The combination defined in claim 13 wherein said delay means includes an additional set of flip-flops, including one flip-flop for each digit of the converted data set, responsive to the voltage level output signals to be delayed, said output control signals, and said synchronizing signals for producing a delayed set of voltage level output signals corresponding to the applied set of voltage level signals.

15. The combination defined in claim 4 wherein said means, responsive to said synchronizing signals and said output control signals for comparing said two sets of voltage level output signals and producing an output signal indicating the result of the comparison includes a logical network for combining each voltage level output signal of one of said sets with the corresponding voltage level output signal of the other of said sets and producing a comparison signal when said corresponding voltage level output signals are identical; a flip-flop having first and second input terminals, and being responsive to signals applied to said first and second input terminals to set to a corresponding stable state, and to signals applied simultaneously to both of said first and second input terminals to change the setting of the flip-flop; first means, responsive to said comparison signal and said output control signals for applying said synchronizing signals to said first input terminal, and second means for applying said synchronizing signals to said second input terminal.

16. The combination defined in claim 15, including means for rendering said first means operable when said corresponding voltage level output signals of said two data signal sets are signals representing the same data column on the card.

17. The combination defined in claim 15, wherein said logical gating network is mechanized according to the logical formula:

$$C_v=(C_1C_7+\bar{C}_1\bar{C}_7)(C_2C_8+\bar{C}_2\bar{C}_8)\ \ldots\ (C_6C_{12}+\bar{C}_6\bar{C}_{12})$$

wherein $C_1$ through $C_6$ reepresent a first set of input signals, $\bar{C}_1$ through $\bar{C}_6$ represent the complements of said first set of input signals, respectively; $C_7$ through $C_{12}$ represent a second set of input signals, $\bar{C}_7$ through $\bar{C}_{12}$ represent the complements of said second set of input signals, respectively; the "+" represents the logical "or" connective, the adjunction of dissimilar terms implies the logical "and" connective and the right hand member of the equation defines the conditions under which an output signal $C_v$ is produced.

18. The combination defined in claim 4, wherein said electronic control circuit includes a modulo-four counter, having four output terminals, and being responsive to said synchronizing signals for cyclically producing output control signals on each of said output terminals; and means responsive to said control signals for applying said synchronizing pulses to said counter.

19. In an electronic data translating system for sensing cards bearing data markings displaced in columns and rows, the columns and rows being at substantially right angles to each other, and producing electrical output signals in accordance with the displacement of the data on the card, a reading and control matrix including: a first reading station for sensing the data marked on the cards and producing a first set of data signals representing the sensed data, said first reading station including a plurality of sensing devices, including one sensing device for each data row on the card, displaced in columnar form for simultaneously sensing a plurality of data rows on the card; a second reading station, displaced in at least one direction with respect to said first reading station, for sensing the data marked on the cards and producing a second set of data signals representing the sensed data, said second reading station including a plurality of sensing devices, including one sensing device for each data row on the card, displaced in columnar form for simultaneously sensing a plurality of data rows on the card; first means for sensing the relative position of the card to produce a start output signal when the first data column on the card is in sensing position before said first reading station; and second means for sensing the relative position of the card to produce a stop output signal when the last data column is in sensing position before said second reading station.

20. The reading and control matrix defined in claim 19, wherein said sensing device of said first and second reading stations is a photoelectric cell.

References Cited in the file of this patent

UNITED STATES PATENTS

| | | |
|---|---|---|
| 2,651,460 | Wilson et al. | Sept. 8, 1953 |
| 2,679,638 | Bensky et al. | May 25, 1954 |
| 2,702,380 | Brustman et al. | Feb. 15, 1955 |

UNITED STATES PATENT OFFICE
Certificate of Correction

Patent No. 2,817,480 December 24, 1957

Ewart M. Baldwin

It is hereby certified that error appears in the printed specification of the above numbered patent requiring correction and that the said Letters Patent should read as corrected below.

Column 12, line 38, Equation (23), for "$K=[Q_x V_4]C_p$" read —$K=[\bar{Q}_x V_4]C_p$—; column 13, line 53, for "theretofore" read —heretofore—.

Signed and sealed this 1st day of April 1958.

[SEAL]

Attest:
KARL H. AXLINE,
*Attesting Officer.*

ROBERT C. WATSON,
*Commissioner of Patents.*